Patented May 22, 1945

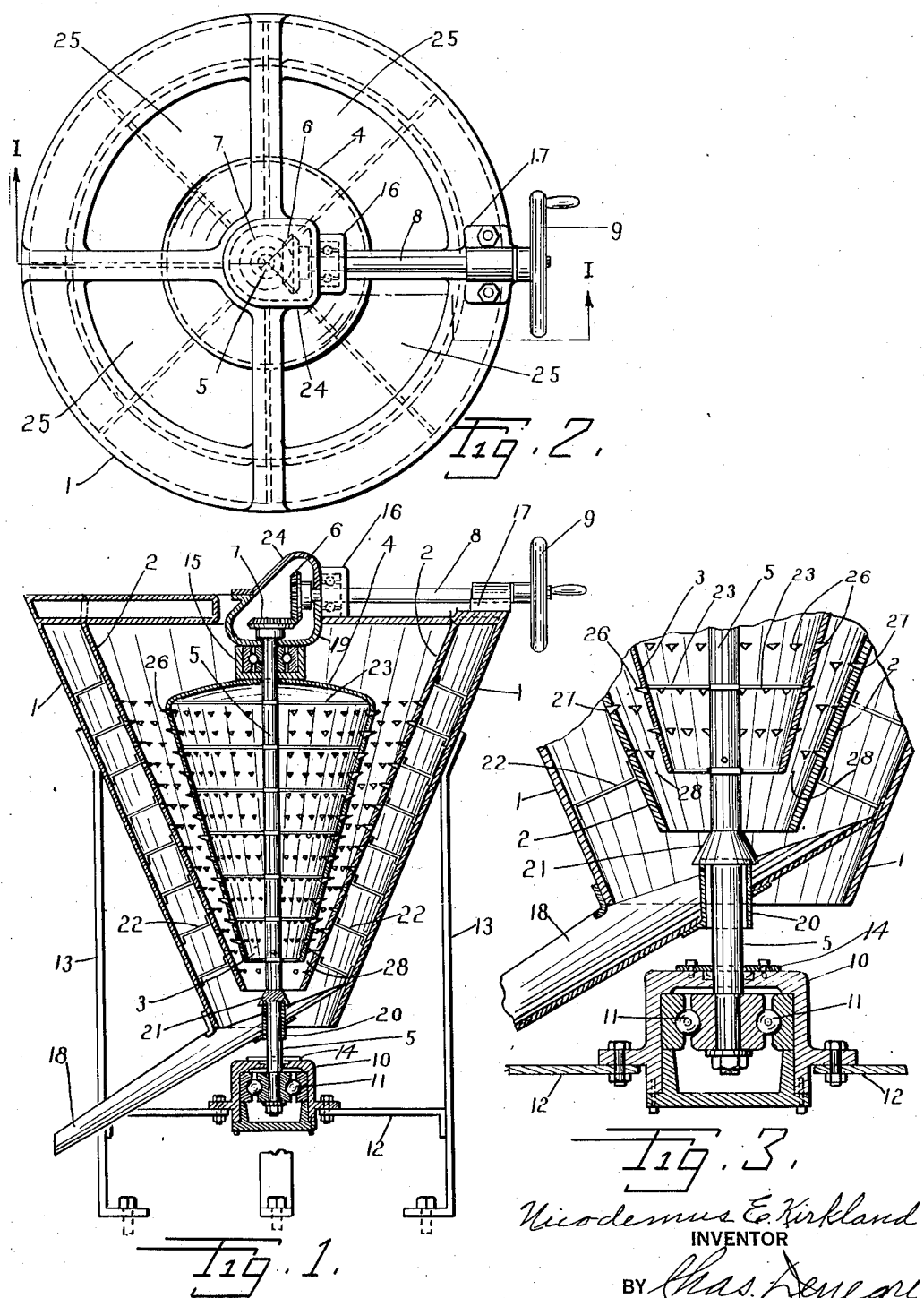

2,376,603

UNITED STATES PATENT OFFICE 2,376,603

POTATO GRATER

Nicodemus E. Kirkland, Leeds, Ala.; Katie Kirkland Curl administratrix of said Nicodemus E. Kirkland, deceased Application April 27, 1942, Serial No. 440,585

3 Claims. (Cl. 146—177)

This invention relates to a grater for potatoes or other similar shaped fruits and vegetables.

The main object of the device is to provide a grater with means to hold the parts in place, said means acting in conjunction with shafts and gears for manually or otherwise operating the grater.

With the above and other objects in view as will hereinafter appear, the invention in general comprises an exterior member as a hopper, an interior member inverted truncated cone shaped, rotatable therein, both of said members being of novel construction and improved means for co-acting operation.

In the accompanying drawing, part of this application, it will be observed that Fig. 1 is a vertical cross section on line 1—1 of Fig. 2; Fig. 2 is a top plan view of the device; Fig. 3 is an enlarged vertical part section of lower portion of the grater.

Similar numerals refer to similar parts throughout the several views.

Again referring to the drawing it will be seen that the device comprises an outer conical shaped hopper with an exterior wall 1 and an interior wall 2 that are held rigidly together by a plurality of braces 22. The inner wall is provided with a plurality of burs or cutters 27 that have their cutting edges directed inwardly. This outer hopper is supported in a suitable frame or base having upright members 13 with a suspended base 12 for carrying a ball bearing 11 in a housing 10 in which a main center shaft 5 revolves. Mounted on said main shaft 5 and attached thereto is an inverted truncated cone shaped member. This member has in its outer wall 3 a plurality of burs or cutters 26 directed outwardly. Burs or cutters in both members are similar and may be of any desired shape for the purpose intended. This inner member must be of strong construction, therefore it is provided with interior braces 23 that extend from and are attached to its wall and lead to the center main shaft 5. The burs or cutters in both members are placed uniformly or otherwise as may be desired. Mounted on the top of the device is a driving shaft 8 supported in two bearings 16—17. This shaft 8 may be manually revolved by a wheel 9 and handle, or power driven from a source not shown. The driving shaft 8 carries a bevel gear 6 co-acting with another bevel gear 7 that is mounted on the upper end of the main upright shaft 5. The upper end of the main shaft 5 revolves in a ball bearing 15. The gears are inclosed in a housing 19—24 for protection and safety. The lower end of the main shaft 5 is provided with a hood 21 and seal 20 to protect the bottom end ball bearing 11. Also an oil seal 14 is on bearing housing 10. At the lower ends of hopper and revolving member there is a passage way 25—28 that leads to a discharge chute 18.

In operation the potatoes or other similar shaped articles are dumped or placed into the top mouth of the hopper and are carried downward by revolving the inner member mounted on the main vertical shaft. As the potatoes or similar articles move downward they are reduced to chips by coming into contact with stationary burs or cutters on the inner wall of the hopper and the moving burs or cutters on the outer face of the revolving member. The chips pass out at the bottom and into the chute.

While I have shown the preferred embodiment of my invention I do not wish to limit myself to the precise and exact details of structure, but reserve the right to make any and all modifications and changes so long as I remain within the spirit and scope of the following claims.

Having described my invention I claim:

1. A potato grater comprising a cone shaped hopper fixed to a stationary base support, the inner surface of same having a plurality of cutters integral with said surface with their cutting edges directed inwardly, a revolvable inner member in said hopper, the outer surface of said revolvable member having a plurality of cutters integral with its said surface; the inner surface of said hopper and the outer surface of said revolvable member being spaced apart more at the top than at the bottom; said revolvable member being mounted surrounding a vertical shaft supported in a bearing at each end, the upper end having a bevel gear mounted thereon disposed to co-act with another bevel gear mounted on a horizontal shaft supported on the top of said hopper, a hand wheel attached to the opposite end of said horizontal shaft and disposed when revolved to revolve the said revolvable member.

2. A fruit and vegetable grater of the class described comprising, a conical shaped hopper rigidly mounted in a supporting base frame, said hopper having an inner conical wall attached to an outer conical wall by means of connecting braces, the inner wall having in its interior surface a plurality of integral burs as cutters with their cutting edges directed inwardly; a revolvable conical shaped member mounted on a vertical main shaft supported in the center of said hopper, integral burs as cutters on the outer face of said revolving member with their cutting edges directed outwardly; a horizontal shaft mounted on the top of said hopper with a bevel gear on one end of said shaft and a manual wheel on the other end, said bevel gear co-acting with a bevel gear mounted on the upper end of said main vertical shaft; said manual wheel when revolved disposed through said horizontal shaft and bevel gear means to revolve said revolvable member mounted in said hopper.

3. A fruit and vegetable grater of the class described comprising two conical shaped main members, one member being held rigidly in a base support, the other member being revolvable on a vertical shaft carried on a bearing in the bottom portion and a bearing in the upper portion of said rigid member; the interior face of said rigid member and the exterior face of said revolvable member having a plurality of integral burs as cutters, said faces being wider apart at the top of the grater than at the bottom to thus form a tapering space between the inner face of said rigid member and the outer face of said revolvable member, said tapering space leading to and discharging into a chute mounted on the bottom portion of said base support; bevel gear and shaft means mounted on the top of said members and disposed when revolved to revolve the revolvable member mounted on said vertical shaft carried interior of said rigid member.

NICODEMUS E. KIRKLAND.